(12) United States Patent
McCann

(10) Patent No.: US 9,580,768 B2
(45) Date of Patent: Feb. 28, 2017

(54) SYNTHETIC SLAG BRIQUETTES FOR USE IN STEELMAKING

(71) Applicant: Dean McCann, Stoney Creek, CA (US)

(72) Inventor: Dean McCann, Stoney Creek, CA (US)

(73) Assignee: METCAN INDUSTRIAL CORP., Stoney Creek, ON ( * ) Notice: Subject to any disclaimer, the term of this patent is extended or adjusted under 35 U.S.C. 154(b) by 86 days.

(21) Appl. No.: 14/255,135

(22) Filed: Apr. 17, 2014

(65) Prior Publication Data

US 2014/0311292 A1 Oct. 23, 2014

Related U.S. Application Data

(60) Provisional application No. 61/814,082, filed on Apr. 19, 2013.

(51) Int. Cl.
C22B 1/24 (2006.01)
C21C 7/06 (2006.01)
C21C 7/00 (2006.01)

(52) U.S. Cl.
CPC ............. *C22B 1/24* (2013.01); *C21C 7/0006* (2013.01)

(58) Field of Classification Search
CPC .................................. C22B 1/24; C21C 7/006
See application file for complete search history.

(56) References Cited

U.S. PATENT DOCUMENTS

| | | | |
|---|---|---|---|
| 2,854,328 A | 9/1958 | Rossborough | |
| 3,058,834 A * | 10/1962 | Koehegyi | C04B 35/057 |
| | | | 501/117 |
| 3,935,004 A * | 1/1976 | Faunce | C22C 1/02 |
| | | | 420/528 |
| 4,627,961 A | 12/1986 | Dudek | |
| 4,808,376 A | 2/1989 | Worcester et al. | |
| 5,242,480 A | 9/1993 | Rebiere et al. | |
| 5,776,225 A * | 7/1998 | Megy | B22F 8/00 |
| | | | 134/2 |

FOREIGN PATENT DOCUMENTS

| | | | |
|---|---|---|---|
| CA | 2290068 | 5/2000 | |
| CN | 101260333 A | 9/2008 | |
| GB | 716856 | 10/1954 | |
| GB | 2078785 | 1/1982 | |
| GB | 2078785 A * | 1/1982 | ............... C21C 7/04 |
| GB | 2346621 | 8/2000 | |
| JP | 2010209369 A * | 9/2010 | |
| RU | 2154676 C1 * | 8/2000 | ............... C21C 7/06 |

OTHER PUBLICATIONS

Mabuchi, Jun et al JP 2010209369 A published Sep. 2010. Machine translation.*
Derwent Acc No. 2012-Q05847 for Sette, Bicalho et al. patent family including BR 201102212 A2 published Sep. 2012. Abstract.*

* cited by examiner

*Primary Examiner* — George Wyszomierski
*Assistant Examiner* — Tima M McGuthry Banks
(74) *Attorney, Agent, or Firm* — Bennett Jones LLP

(57) ABSTRACT

The invention relates to a synthetic slag forming briquette encased in an aluminum shell. The briquette may include a deoxidizing agent, calcium oxide, calcium fluoride, calcium aluminate, magnesia, or dolomitic lime, or combinations thereof. The deoxidizing agent may include calcium carbide, powdered aluminum or magnesium, or combinations thereof. The aluminum shell may be formed from molten aluminum, or aluminum sheet or foil.

6 Claims, No Drawings

SYNTHETIC SLAG BRIQUETTES FOR USE IN STEELMAKING

CROSS REFERENCE TO RELATED APPLICATIONS

This application claims the priority benefit of U.S. Provisional Patent Application No. 61/814,082 filed on Apr. 19, 2013 entitled "Calcium Carbide Briquettes For Use in Steelmaking", the contents of which are incorporated herein by reference.

FIELD OF THE INVENTION

The present invention is directed to aluminum coated synthetic slag briquettes for use in steelmaking.

BACKGROUND

Steelmaking is often a batch procedure involving several steps. Molten metal is continuously produced in a blast furnace to produce molten iron, which is then transformed into steel by blowing oxygen. Steel scrap may be used to produce new steel in a primary melting vessel.

There is a broad variety of steel scrap, both in terms of composition (from plain carbon steel through to highly alloyed tool steel) and geometry (from finely shredded sheet through to large beams). The Electric Arc Furnace (EAF) is today the most common way to recycle steel from scrap. By melting the scrap in a furnace with an electrical current, new, functional steel can be produced from old products. Instead of deploying raw material resources, basic steel elements and valuable alloys can be reused, which is beneficial from both an economic and environmental point of view. After the scrap has been melted, the temperature is normally increased so that refining reactions can be carried out. Oxygen and carbon may be injected into the steel and slag phases respectively. However, the reactions can also create products which are detrimental to the steel quality and which therefore need to be handled carefully.

It is well known that the metallic oxides having a lower density float to the surface and generate what is known as a primary or natural slag. This slag is comprised mainly of oxides of iron, calcium, silicon, magnesium, manganese, and aluminum. The proportions of the non-metallic oxides is not compatible with the refractory system used to line the holding vessel, referred to as a ladle. Furnace slag in the ladle is known to increase production costs, and is known to contribute to poor alloy recovery, poor desulphurization and a general decrease in steel quality. It is a common practice to reduce the amount of primary slag as low as possible by mechanical methods including but not limited to skimming the slag, or through equipment design such as eccentric bottom tapping configurations.

However, slag is also important in steelmaking. In addition to absorbing impurities from the steel, the slag also protects the steel from the atmosphere. Furthermore, it protects the furnace and ladle walls from the electric arcs, thereby increasing electrical efficiency and improving refractory lining life by providing a coating on the working surface. It is therefore of great importance to maintain a high slag quality and provide it with foaming properties.

Slag is formed with the help of slag forming agents, such as lime, dolomite and/or fluorospar, or other common flux material. Slag properties such as, without limitation, viscosity, sulfur capacity, and phosphorus capacity vary with composition and temperature. Some of the metallic oxides that end up in the slag are acidic, so adding basic slag forming agents helps to keep the basicity of the slag at an appropriate level. High slag basicity (i.e. high lime to silica ratio) is also beneficial for phosphorus removal but care must be taken not to saturate the slag with lime as this will lead to an increase in slag viscosity, which will make the slag less effective.

Regardless of the effectiveness of the method employed to reduce primary slag, a certain amount of slag will remain, or be generated through the re-oxidation of iron or steelmaking alloys through contact with atmospheric oxygen. In order to prevent the re-oxidization, and to change the chemistry through dilution of any remaining primary slag, a synthetic slag is introduced. Synthetic slag is typically comprised mainly of calcined calcium oxide (quicklime), magnesia or dolomitic lime, and a fluxing additive to lower the melting point. The flux may be calcium fluoride, calcium aluminate or wollastonite. A de-oxidant such as aluminum or silicon bearing alloys may also be a constituent of the synthetic slag formulation to aid in reducing oxygen levels in both the slag and the resulting batch of steel. The act of reducing the oxygen content with aluminum or silicon is referred to as killing the steel or slag.

Synthetic slags are typically used in the form of powders or coarse granules. Powdered forms are typically less favorable due to dust formation, and the increased surface area of the particulate, which makes it more prone to re-hydration.

For economic as well as quality reasons, the synthetic slag does not facilitate the killing of the steel. Any aluminum or silicon contained in the synthetic slag formulation is present only to deoxidize the primary slag that is present. This is problematic, as the exact chemistry or mass of primary slag present can range quite dramatically. A well known alternative to aluminum or silicon slag de-oxidation is the utilization of calcium carbide.

Calcium carbide reacts chemically with the oxygen in the primary slag. It does not react with oxygen in the steel, and therefore does not alter the steel chemistry. The technical benefits of using calcium carbide as a slag deoxidant is well documented, however, such use is not widespread due to safety concerns regarding its storage and handling. Calcium carbide is very hygroscopic, and the result of any contact with water in any form is the formation of acetylene gas. Accordingly, there are regulations which require calcium carbide to be packaged only in enclosed metal containers. The packaging restrictions are such that calcium carbide as a part of a synthetic slag formulation is generally unacceptable for both economical and logistical reasons. Furthermore, the possible formation of acetylene gas and the resulting fire and explosion hazard has resulted in the general avoidance of using calcium carbide as a slag deoxidant.

SUMMARY OF THE INVENTION

In one aspect, the invention comprises a synthetic slag forming briquette encased in an aluminum shell. The briquette may comprise a deoxidizing agent, calcium oxide, calcium fluoride, calcium aluminate, magnesia, or dolomitic lime, or combinations thereof. The deoxidizing agent may comprise calcium carbide, powdered aluminum or magnesium, or combinations thereof.

In another aspect, the invention may comprise a method of making a briquette for forming a synthetic slag, comprising the steps of briquetting synthetic slag ingredients and coating or encasing the briquette in an aluminum shell. The briquette may be spray-coated or dipped in molten aluminum, or may be encased in sheet or foil aluminum.

In another aspect, the invention may comprise a method of steelmaking comprising the step of forming a synthetic slag using the briquette described herein.

DETAILED DESCRIPTION OF PREFERRED EMBODIMENTS

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

As used herein, the term "briquette" means a lump or block of powdered or granular material, typically formed by compaction or compression in a mold. The briquette may rely on cohesion or adhesion between the powder or granules to maintain its physical integrity, and may comprise a binder material.

In one embodiment, the invention comprises methods for synthetic slag making using as briquette which is coated or encased in aluminum. The briquettes may comprise conventional synthetic slag ingredients, including but not limited to a deoxidizing agent, calcium oxide, calcium fluoride, calcium aluminate, alumina, magnesia, silica, dolomitic lime. In one embodiment, the deoxidizing agent comprises calcium carbide, powdered aluminum or, in the case of iron making, powdered magnesium, or combinations thereof. In one embodiment, the briquette comprises calcium carbide preferably not less than 3% by weight, and up to, but not limited to, 20% by weight calcium carbide, for example between 5.0 to 20.0% (wt), and every value within that range, in 0.1% increments. The amount of calcium carbide may be determined by a person skilled in the art depending, at least in part, on primary slag parameters. Calcium carbide may be comprised as a solid particulate material, ranging from fine powders of 100 nm to 2500 nm to coarse particles of greater than 15 or 20 mm diameter.

In one embodiment, binders or lubricants, or both, may be used to improve the briquetting process and the resulting briquette, provided that any added material does not comprise water if the briquette includes calcium carbide. Binders are additives that increase the strength of the briquette by helping to hold the particles together, but they can be costly and may require a more complex system of machinery for handling, proportioning, and mixing. Lubricants are classified as internal or external. Internal lubricants are mixed into the feed material before briquetting and provide a denser briquette by reducing friction between particles during compaction. External lubricants work by reducing friction between the surfaces of the agglomerates and the rolls that form them, and can sometimes add the benefits of faster briquetting speeds and reduced wear on the forming rolls. Suitable binders or lubricants include oxalic acid or calcium stearate. In one embodiment, calcium stearate may be added at a rate of 0.1 to 0.25 percent of total batch weight.

The synthetic slag forming composition may be blended using particle sizes suitable for the intended briquette size and briquetting equipment.

Suitable briquetting equipment is well known in the art, and need not be further described herein. For example, roll-type presses are well known for briquetting lime or quicklime fines, and may be suitable for briquetting particulate calcium carbide.

The briquettes may then be coated, encased or enrobed with aluminum, which serves one or more purposes of sealing the briquette and preventing hydration and/or oxidation, as a shield to help protect the briquette from mechanical damage through handling, thereby preventing material loss. The aluminum coating will also satisfy the packaging restrictions stating that calcium carbide must be packaged in a metal container.

In one embodiment, the briquettes may be coated with molten aluminum, which may be sprayed onto the briquettes, or the briquettes may be submerged or dipped into molten aluminum. A film of molten aluminum will solidify on the surface of the briquette, and effectively seal the briquette from re-hydration.

The proportion of aluminum to the briquette will depend on the thickness of the coating, and the size of the briquette. The thickness of the coating may be controlled by: controlling temperature of briquettes being coated, controlling temperature of aluminum being either sprayed, or the aluminum bath in which the briquettes will be submersed. The residence time of the submersion will also be a control factor that will help determine the aluminum shell thickness.

In another embodiment, the briquette may be wrapped or encased in sheet aluminum or aluminum foil.

In one embodiment, the application of aluminum, whether in molten or solid form, may be performed in a dehumidified inert atmosphere, such as in the presence of nitrogen gas, or in a vacuum.

Advantageously, the aluminum coating itself will further aid in the deoxidation of the primary slag, and the steel bath itself, rendering the aluminum shell an integral part of the synthetic slag briquette chemistry.

In one embodiment, the briquettes may comprise between about 1% to about 40% calcium carbide, and between about 0% to about 15% metallic aluminum powder, by weight of an uncoated briquette, with the balance made up of conventional synthetic slag materials. For example, a briquette may have a composition falling within the ranges shown in Table 1 below. The ranges shown include every value within the range, increasing in 0.1% increments.

TABLE 1

| Compound | Weight % (excluding Al shell) |
|---|---|
| CaC | 1%-40% |
| CaO | 20%-80% |
| Al | 0%-15% |
| $Al_2O_3$ | 0%-20% |
| MgO | 0%-10% |
| $SiO_2$ | 0%-5% |
| $CaF_2$ | 0%-25% |

As will be apparent to those skilled in the art, various modifications, adaptations and variations of the foregoing specific disclosure can be made without departing from the scope of the invention claimed herein.

What is claimed is:

1. A synthetic slag forming briquette encased in an aluminum shell, comprising a deoxidizing agent comprising calcium carbide, powdered aluminum or magnesium, or combinations thereof.

2. The briquette of claim 1 further comprising calcium oxide, calcium fluoride, calcium aluminate, magnesia, or dolomitic lime, or combinations thereof.

3. The briquette of claim 1 comprising the composition of Table 1.

4. The briquette of claim 1 further comprising a lubricant or a binder, or both lubricant and binder.

5. The briquette of claim 1 further comprising oxalic acid or calcium stearate.

6. A method of steelmaking or ironmaking comprising the step of forming a synthetic slag using the briquette of any one of claims 1, 2, 3, 4 or 5.

* * * * *